(12) United States Patent
Xiao

(10) Patent No.: US 7,269,514 B2
(45) Date of Patent: Sep. 11, 2007

(54) SYSTEM AND METHOD FOR CORRECTING INDUCTION LOGGING DEVICE MEASUREMENTS BY ALTERNATELY ESTIMATING GEOMETRY AND CONDUCTIVITY PARAMETERS

(75) Inventor: Jiaqi Xiao, Houston, TX (US)

(73) Assignee: Halliburton Energy Services, Inc, Houston, TX (US)

( * ) Notice: Subject to any disclaimer, the term of this patent is extended or adjusted under 35 U.S.C. 154(b) by 38 days.

(21) Appl. No.: 10/843,072

(22) Filed: May 11, 2004

(65) Prior Publication Data

US 2005/0256644 A1 Nov. 17, 2005

(51) Int. Cl.
*G01V 1/40* (2006.01)
*G01V 3/10* (2006.01)
(52) U.S. Cl. .......................... 702/6; 324/339
(58) Field of Classification Search ............... 702/6, 702/7, 11, 9–10; 703/5, 10; 367/25, 35; 324/339, 348, 333–338, 345–347, 356; 340/854.8
See application file for complete search history.

(56) References Cited

U.S. PATENT DOCUMENTS

| | | | | |
|---|---|---|---|---|
| 3,697,864 | A * | 10/1972 | Runge | 324/368 |
| 4,604,581 | A * | 8/1986 | Thadani et al. | 324/339 |
| 4,611,173 | A * | 9/1986 | Bravenec et al. | 324/339 |
| 5,041,975 | A * | 8/1991 | Minerbo et al. | 702/7 |
| 5,210,691 | A * | 5/1993 | Freedman et al. | 702/7 |
| 6,219,619 | B1 * | 4/2001 | Xiao et al. | 702/7 |
| 6,442,488 | B2 * | 8/2002 | Xiao et al. | 702/9 |

OTHER PUBLICATIONS

Wang, H., Simultaneous Reconstruction of Geometric Parameter and Resistivity Around Borehole in Horizontally Stratified Formation from Multiarray Induction Logging Data, Jan. 2003, IEEE Transactions on Geoscience and Remote Sensing, vol. 41, No. 1, Pag.*

Lovell et al., Effect of Tool eccentricity on Some Electrical Well-Logging Tools, Jan. 1990, IEEE Transactions on Geoscience and remote Sensing, vol. 28, No. 1, pp. 127-136.*

Wang, H., Simultaneous Reconstruction of Geometric Parameter and Resistivity Around Borehole in Horizontally Stratified Formation from Multiarray Induction Logging Data, Jan. 2003, IEEE Transactions on Geoscience and Remote Sensing, vol. 41, No. 1.*

Grove, G.P. and Minerbo, G.N., "An Adaptive Borehole Correction Scheme for Array Induction Tools," 32nd Annual Logging Symposium Transactions: Society of Professional Well Log Analysts, Jun. 16-19, 1991, p. J1-25.

(Continued)

*Primary Examiner*—Donald E. McElheny, Jr.
*Assistant Examiner*—Toan M. Le
(74) *Attorney, Agent, or Firm*—Krueger Iselin LLP

(57) ABSTRACT

A method and related system for correcting measurements obtained from an induction logging device. In one embodiment, the method comprises: receiving conductivity measurements from a multi-array induction tool; constructing a measurement pattern vector from the conductivity measurements; determining one or more geometry parameters associated with an approximation of the measurement pattern vector; finding borehole geometrical factors using current values of the one or more conductivity parameters and of the one or more geometry parameters; and calculating improved estimates of the one or more conductivity parameters using current values of the borehole geometric factors. The geometry parameters may be determined by finding a geometry pattern vector that best fits the measurement pattern vector. The determining, finding, and calculating operations may be repeated until a predetermined condition is satisfied. Finally, the conductivity measurements may be corrected for environment effects using calculated conductivity parameters and geometry parameters.

37 Claims, 3 Drawing Sheets

OTHER PUBLICATIONS

Gianzero, S.C., "Effect of Sonde Eccentricity on Responses of Conventional Induction-Logging Tools," IEEE Transaction on Geoscience and Electronics, GE-16(4), Oct. 1978.

Goldfarb, D. and Idani, A., "A Numerically Stable Dual Method for Solving Strictly Convex Quadratic Programs," Mathematical Programming, 1983, 27, 1-33.

* cited by examiner

SYSTEM AND METHOD FOR CORRECTING INDUCTION LOGGING DEVICE MEASUREMENTS BY ALTERNATELY ESTIMATING GEOMETRY AND CONDUCTIVITY PARAMETERS

BACKGROUND

Modem petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe (or "sonde") housing formation sensors is lowered into the borehole after some or all of the well has been drilled. The formation sensors are used to determine certain characteristics, such as conductivity and resistivity, of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by transmitting electrical signals through the wireline.

An alternative method of logging is the collection of data during the drilling process. Collecting and processing data during the drilling process eliminates the necessity of removing ("tripping") the drilling assembly to insert a wireline logging device. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MMWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

In both MWD and wireline logging, the measurements obtained from a logging device may be skewed by the borehole environment in which the logging device operates, a phenomenon commonly referred to as the "borehole effect." Various environmental variables, such as the eccentricity of the logging device, the diameter of the borehole, the conductivity of the earth formations, and the conductivity of the drilling fluid ("mud"), may contribute to the borehole effect. Although techniques exist to correct for the borehole effect in measurements taken from logging devices, these techniques may be computationally intensive and prone to poor resolvability.

SUMMARY

The problems noted above are solved in large part by a method and related system for correcting measurements obtained from an induction logging device. In one embodiment, the method comprises: receiving conductivity measurements from a multi-array induction tool; forming an initial estimate of one or more conductivity parameters; constructing a measurement pattern vector from the conductivity measurements; determining one or more geometry parameters from the measurement pattern vector; finding borehole geometrical factors using current values of the one or more conductivity parameters and of the one or more geometry parameters; and calculating improved estimates of the one or more conductivity parameters using current values of the borehole geometrical factors. The geometry parameters may be determined by finding the best fit for the measurement pattern vector from the pattern vectors transformed from pre-calculated borehole geometrical factors. The determining, finding, and calculating operations may be repeated until a predetermined condition is satisfied. The conductivity measurements may then be corrected for borehole environment effects using the calculated conductivity parameters and geometry parameters.

BRIEF DESCRIPTION OF THE DRAWINGS

In the following detailed description, reference will be made to the accompanying drawings in which.

NOTATION AND NOMENCLATURE

Figure 1:
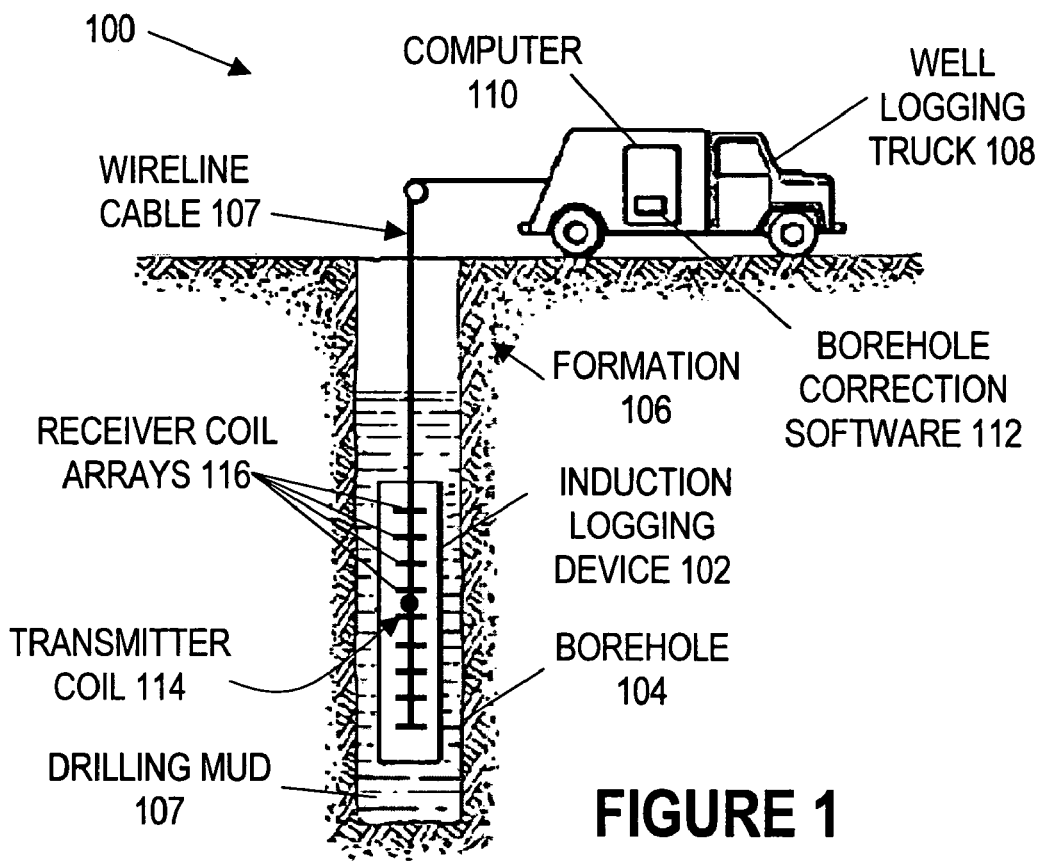
FIG. 1 illustrates a wireline logging system in accordance with various embodiments of the invention.

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection or through an indirect electrical connection via other devices and connections. Finally, at least some of the embodiments perform actions "at the rig site," which is intended to mean not only locations proximate to the drilling equipment at the surface, but also one or more boreholes created by the drilling equipment.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be illustrative of that embodiment, and not intended to suggest that the scope of the disclosure, including the claims, is limited to that embodiment.

An induction logging device, utilized during conventional wireline logging or measurement-while-drilling (MWD), may be disposed in a borehole to measure the conductivity or resistivity of the earth formations surrounding the borehole. Typically, the induction logging device comprises at least one transmitting and at least one receiving coil vertically spaced from each other and mounted on a support. After being energized by an alternating current, the transmitting coil generates a fluctuating electromagnetic field that induces eddy currents in the formation surrounding the borehole. These eddy currents flow coaxially around the borehole and have an amplitude proportional to the conductivity of the formation. The eddy currents generate a secondary electromagnetic field that induces, through electromotive force (EMF), a signal in the receiving coil. The signal may be detected as a voltage, amplified, and converted into a digital form. This digital signal represents a measurement by the induction logging device. Based on the measured signal, an approximation of the formation conductivity may be calculated. However, the accuracy of this approximation may be affected by four environmental variables, namely the eccentricity of the induction array device, the diameter of the borehole, the conductivity of the earth formation, and the conductivity of the mud. The methods and apparatus disclosed herein correct measurements obtained from an induction logging device to account for these environmental variables, thereby providing a more accurate reading of formation conductivity.

FIG. 1 illustrates an illustrative wireline logging system 100. As shown, the wireline logging system 100 comprises an induction logging device 102 disposed in a borehole 104 containing drilling mud 105. The borehole 104 penetrates a formation 106, which may comprise several distinct layers of rock, referred to as "beds." The induction logging device 102 is connected by a wireline cable 107 to a well-logging truck 108 located at the rig site. The wireline cable provides power to the induction logging device 102 and is used to transmit measurements taken from the device to the well-logging truck 108. The well-logging truck 108 contains a computer 110 that receives the measurements, preferably stores the measurements, and utilizes the measurements to operate borehole correction software 112.

The induction logging device 102 preferably comprises a transmitter coil 114 and one or more receiver coil arrays 116 attached to a support. Although not specially shown, each receiver coil array 116 may comprise a main coil and a bucking coil connected in series. The bucking coil is designed to remove any direct coupling between the transmitter coil 114 and the main coil. Drilling mud 105 may be disposed in the borehole 104 to cool the drill bit, condition the walls of the formation 106, and equalize the pressure in the borehole 104. Although FIG. 1 may be representative of a conventional wireline logging system, measurement-while-drilling (MWD) techniques may be similarly employed.

Figure 2:
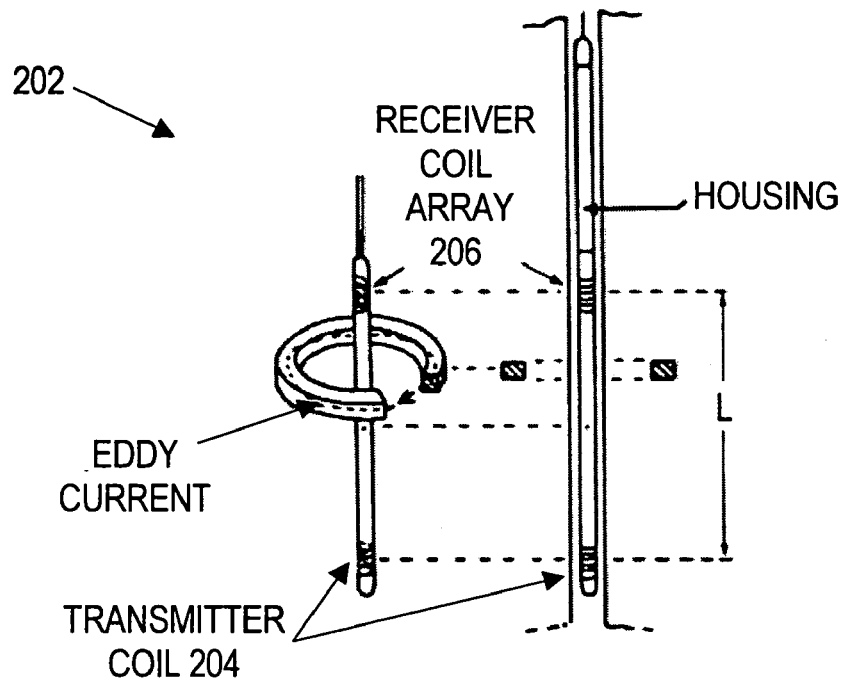
FIG. 2 illustrates an illustrative induction logging device in accordance with various embodiments of the invention.

FIG. 2 illustrates the electrical principles associated with an illustrative induction logging device 202. The illustrative device 202 comprises one transmitter coil 204 and one receiver coil 206 separated by a vertical distance L. Alternating current energizes the transmitter coil 204 and generates a fluctuating electromagnetic field. The fluctuating electromagnetic field creates eddy currents in the formation having an intensity proportional to the conductivity of the formation. The eddy currents produce a secondary electromagnetic field, which induces a voltage on the receiver coil array 206. Typically, the voltage is amplified and measured as a complex voltage value, the real part of which represents the voltage in phase with the transmitter current. The transmitter coil 204 may be excited with currents having different frequencies, and a voltage may be extracted for each frequency of current used to energize the transmitter coil. Since the intensity of the eddy currents are proportional to the formation conductivity, an approximation of formation conductivity may be calculated from each of the measured voltages.

The magnitudes of the eddy currents depend upon the conductivity of the formation and the frequency of the exciting current. The secondary electromagnetic field, which is generated by the eddy currents and used to induce a voltage in the receiver coil, attenuates with depth into the formation. At high frequencies, the majority of the eddy currents tend to stay near the surface of the formation, a phenomenon commonly known as the "skin-effect." Thus, the magnitude of the secondary electromagnetic field may be greatest just inside the walls of the formation.

As shown in FIG. 1, induction logging devices typically have multiple arrays of receiver coils, each array having a different depth of investigation into the formation, resulting in different measured voltage values. The depth of investigation for each array represents the radial distance from the induction logging device to a point within the formation where the array-measured response is considered to be centered. Since the skin-effect is related to the frequency of the alternating current, multiple voltage readings obtained at distinct, known frequencies from each array may be utilized to calculate a skin-effect corrected measurement of formation conductivity for each of the receive coil arrays, regardless of the array's depth of investigation. Thus, each receiver coil array may produce a single skin-effect corrected measurement of formation conductivity from measurements obtained at distinct frequencies.

Once the skin-effect corrected measurements are obtained from the induction logging device for each receiver coil array, the borehole correction software 112 (FIG. 1) may compensate for the borehole effect to determine borehole corrected values of formation conductivity ($\sigma_{BHC}$). Assuming a homogenous formation of conductivity ($\sigma_F$), the borehole-corrected values may be modeled by the following relation:

$$\sigma_{BHC} = \frac{\sigma_{SEC} - \sigma_{MUD} \times G_{BH}(\text{eccentricity, diameter}, \sigma_{MUD}, \sigma_F)}{1 - G_{BH}(\text{eccentricity, diameter}, \sigma_{MUD}, \sigma_F)} \quad (1)$$

where $\sigma_{BHC}$ represents the borehole-corrected conductivity; $\sigma_{SEC}$ represents the skin-effect correct measurements of formation conductivity; and $G_{BH}$ represents the borehole geometrical factor, which is a function of the four environmental variables, namely the eccentricity of the induction device, the diameter of the borehole, the conductivity of the mud ($\sigma_{MUD}$), and the homogenous formation conductivity ($\sigma_F$).

Figure 3:
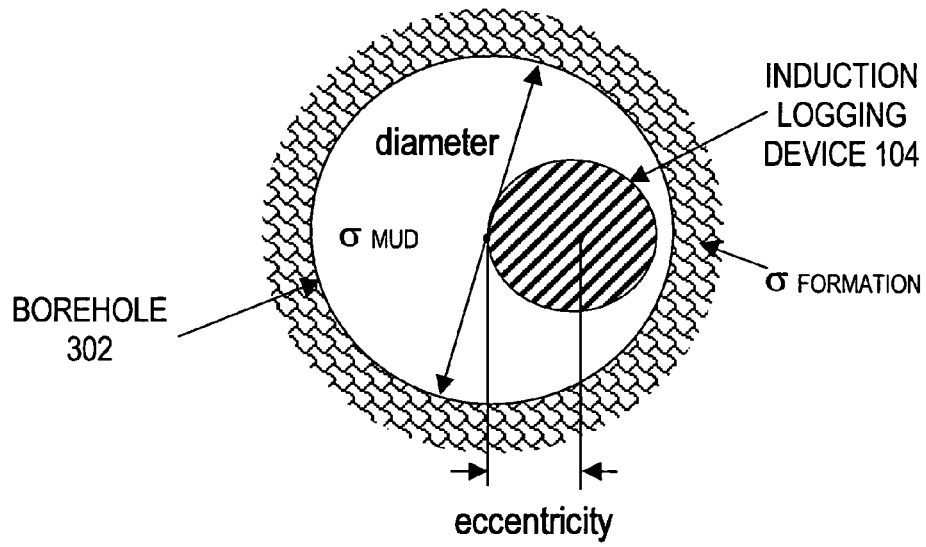
FIG. 3 illustrates four environmental parameters associated with a borehole.

FIG. 3 illustrates the four environmental variables associated with the borehole geometrical factor in greater detail. As shown, the eccentricity of the induction device may represent the distance from the center of the device to the center of the borehole. The borehole diameter, conductivity of the mud ($\sigma_M$), and the apparent conductivity of the formation ($\sigma_F$) are also shown.

Figure 4:
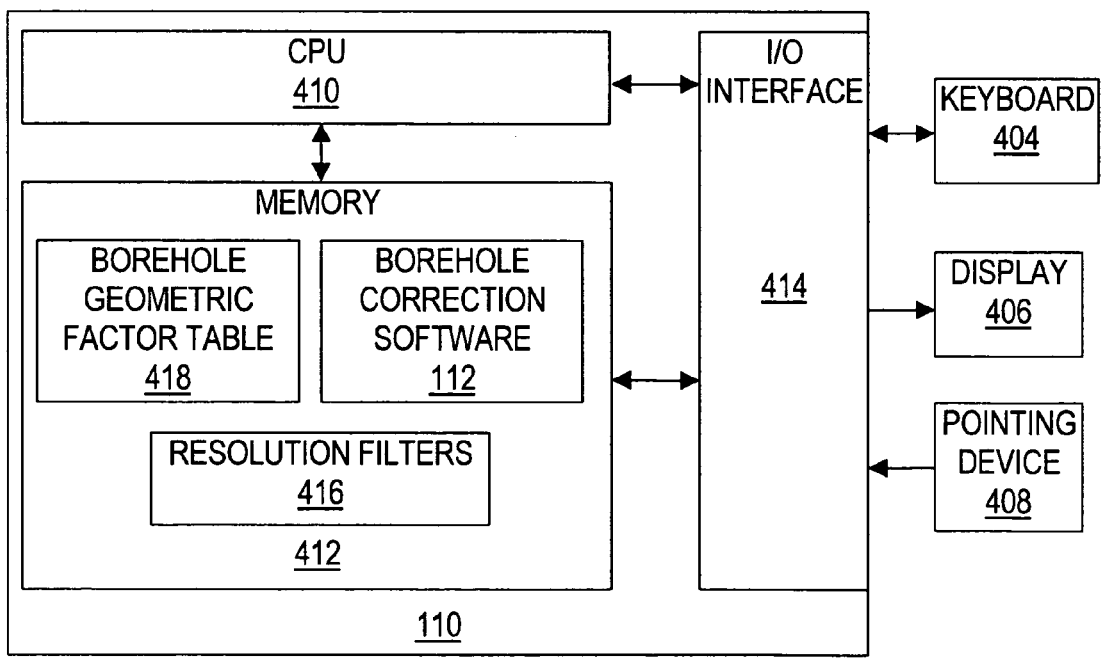
FIG. 4 illustrates a measurement correction system configured in accordance with various embodiments of the invention.

FIG. 4 illustrates a correction system 400 that may be used to operate the borehole correction software 112 (FIG. 1). The system 400 comprises the computer system 110 coupled to one or more input/output devices, such as a keyboard 404, a display 406, and a pointing device 408. The computer system 110 comprises a central processing unit (CPU) 410, a memory 412, and an input/output (I/O) interface 414. The I/O interface 414 facilitates the exchange of data between the I/O devices 404-408 and the computer system 110. The memory 412 may comprise any type of volatile or non-volatile memory, including random access memory (RAM), read-only memory (ROM), and a hard drive. Stored within the memory 412 are resolution filters 416, a borehole geometrical factor table 418, and the borehole correction software 112. The resolution filters 416 and the borehole geometrical factor table 418 comprise predetermined data used by the borehole correction software 112 to calculate the borehole corrected formation conductivity ($\sigma_{BHC}$). Although the correction system 400 preferably resides at the rig site or in the well logging truck 108 (FIG. 1), at least some embodiments of the invention perform the processing associated with the correction system 400 in an offsite location. Various embodiments of the invention may also store a configuration file in the memory 412 that contains options and settings for the borehole correction software 112.

Figure 5:
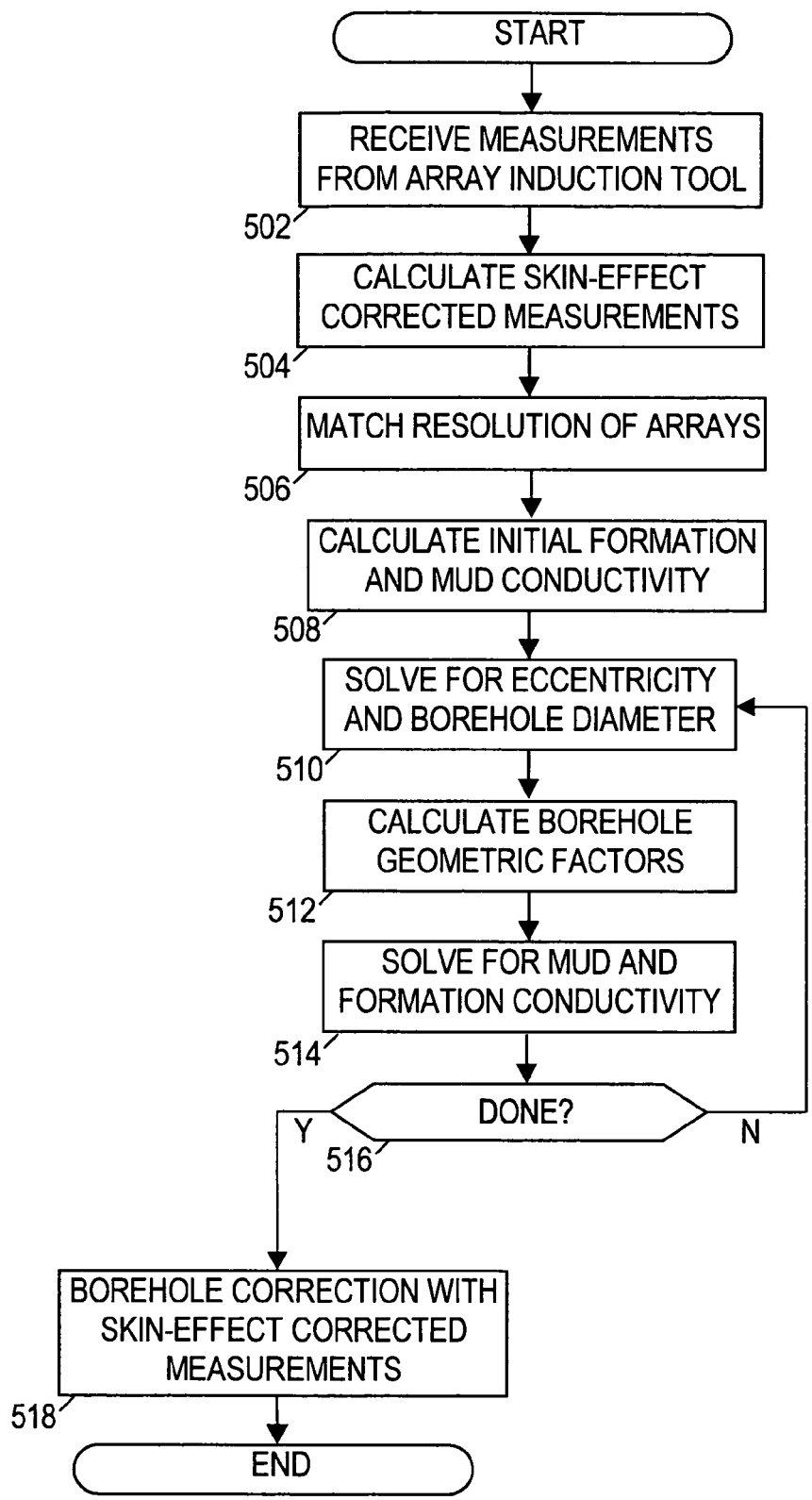
FIG. 5 is a flow diagram, illustrating a method that may be used to correct measurements obtained from an induction logging device, in accordance with various embodiments of the invention.

FIG. 5 provides an illustrative procedure that may be performed by the borehole correction software 112 to solve for the four environmental variables and produce borehole corrected values of conductivity. Although the following discussion is directed to an illustrative induction device comprising two receiver coil arrays and one transmitter coil that is excited by three distinct frequencies, the procedure presented is widely applicable to induction logging devices with any number of receiving coil arrays and transmitting coils that are excited by various frequencies of alternating current. The illustrative procedure may start with computer 110 receiving six measurements (measurements from two receiver coil arrays at three different frequencies) from the induction logging device (block 502). Each receiver coil array measures the formation at a distinct vertical position. Although the measurements may be received as voltage values, the illustrative procedure assumes the induction tool has converted voltage measurements into calibrated conductivity measurements. The measurements then may be skin-effect corrected for each receiver coil array (block 504), resulting in one skin-effect corrected measurement for each of the three arrays. After skin-effect correction, the measurements may be filtered by the quasi-linear resolution filters 416 (FIG. 4) to match the vertical resolution of the three measurements (block 506). As can be appreciated by one of ordinary skill in the art, each receiver coil array may measure the formation with a distinct vertical resolution because of the thickness of the formation at distinct vertical layers. The resolution filters 416 are designed to balance the measurements from the receiver coil arrays, regardless of formation thickness.

After applying the filters, an initial formation conductivity ($\sigma_F$) and an initial mud conductivity ($\sigma_{MUD}$) may be calculated (block 508). The initial formation conductivity ($\sigma_F$) may be calculated using a weighted average:

$$\sigma_F = \sum_i^m w_i \times \sigma_{SEC}^i \quad (2)$$

where $w_i$ is a weighting factor for the $i^{th}$ receiver coil array; $\sigma_{SEC}^i$ is the skin-effect corrected conductivity of the $i^{th}$ receiver coil array; and m is the total number of receiver coil arrays. Since the drilling mud may invade into porous, permeable zones of the formation where the pressure of the mud is greater than that of the formation fluids, the weighting factor $w_i$ may favor contributions from the receiver array coils with medium or deep depths of investigation, thereby reducing the contributory effect the mud conductivity may have. The initial mud conductivity ($\sigma_{MUD}$) may also be calculated from a weighted average:

$$\sigma_{MUD} = \sum_i^m v_i \times \sigma_{MS}^i \quad (3)$$

where $v_i$ is a weighting factor for the $i^{th}$ receiver coil array; $\sigma_{MS}^i$ is a mud sensor measured conductivity of the drilling mud at the $i^{th}$ receiver coil array; and m is the total number of receiver coil arrays. The weighting factors ($v_i$) may favor contributions from the receiver array coils with shallow depths of investigation. Alternatively, mud conductivity measurements may be made with fluid conductivity sensors.

As will be described in greater detail below, the illustrative procedure may proceed by solving model equations for the borehole diameter and eccentricity of the induction logging device (block 510), calculating the borehole geometrical factors (block 512), and solving for the mud conductivity ($\sigma_{MUD}$) and the formation conductivity ($\sigma_F$) (block 514) iteratively. The iterations continue until at each receiver coil array a predetermined number of iterations has occurred or the solution to the four environmental variables stabilizes to within a predetermined range (block 516). The number of iterations and/or the stability range may incorporated into the correction system 400 (FIG. 4) via the keyboard 404 and/or the pointing device 408. In other embodiments, the number of iterations and/or the stability range may be part of the configuration file stored in the memory 412. During each iteration of blocks 510-514, the value of the mud conductivity ($\sigma_{MUD}$) and the formation conductivity ($\sigma_F$) are updated in accordance with model calculations. Each successive iteration tends to converge to the actual value of the four environmental variables.

The process of solving for the borehole diameter (also referred to as the "borehole size") and eccentricity of the induction logging device (block 510) may be performed by pattern space analysis, in which a multi-dimension Euclidean space is constructed. The array induction measurements may be expressed as a point in the "measurement space", presented by a multi-element vector ($\Omega_a$) containing the skin-effect corrected conductivity from each receiver coil array, and expressed as:

$$\Omega_a \epsilon \{\sigma_{SEC}^1, \sigma_{SEC}^3, \sigma_{SEC}^3, \ldots, \sigma_{SEC}^m\} \quad (4)$$

where, $\Omega_a$ is a multi-element vector for conductivity; $\sigma_{SEC}^i$ is the skin-effect corrected measurement for the $i^{th}$ array; and m is the total number of receiver coil arrays.

The geometry variables (i.e., the borehole diameter and the eccentricity of the logging device) are more contained in the trend formed by the induction measurements of different transmitter-receiver spacings than in the absolute amplitude of those measurements. In addition, the borehole geometrical factors are primarily determined by the geometry variables. In order to enhance the sensitivity of the induction measurements to the geometry variables, the trend of the measurements is mathematically extracted by constructing a pattern vector ($\Psi$), corresponding to a point in the "pattern space," which is defined as:

$$\Psi \in \{\delta^1, \delta^2, \ldots, \delta^{m-1}\} \tag{5}$$

$$\text{where, } \delta^i = \frac{\sigma^i_{SEC} - \sigma^{i+1}_{SEC}}{\sigma_{MUD} - \sigma_F}; \tag{6}$$

$\sigma_{SEC}^i$ is the skin-effect corrected measurement for the $i^{th}$ array;

$$\sigma^{i+1}_{SEC}$$

is the skin-effect corrected measurement from the $i+1^{th}$ array; σhd F is the current value of formation conductivity (initially derived from Equation (2) for the first iteration and updated on subsequent iterations); $\sigma_{MUD}$ is the current value of mud conductivity (initially derived from Equation (3) for the first iteration and updated on subsequent iterations). When $\sigma_{MUD}$ and $\sigma_F$ equal their true values, Equation (6) may be further derived into:

$$\delta^i = G_{bh}^i - G_{bh}^{i+1}. \tag{7}$$

Since $G_{bh}^i$ and $G_{bh}^{i+1}$ primarily depend on the geometry variables, the pattern vector, therefore, primarily depends on the geometry variables: the borehole diameter (cal) and the eccentricity (ecc). Therefore, the preceding transformation increases the sensitivity of the eccentricity of the induction logging device and the borehole diameter, while suppressing the sensitivity of the mud conductivity ($\sigma_{MUD}$), and the formation conductivity ($\sigma_F$). Thus, with the initial calculation of formation conductivity ($\sigma_F$) from Equation (2) and an approximation of the mud conductivity ($\sigma_{MUD}$) from Equation (3), the eccentricity of the induction logging device and the borehole diameter can be solved in the pattern domain. The borehole geometrical factors stored the predetermined borehole geometrical factor table 418 (FIG. 4) are also transformed into pattern domain expressed by $\Phi$, which is defined as:

$$\Phi \in \{\delta_{PRE\_CAL}^i(cal^j, ecc^k, \sigma_{MUD}^l, \sigma_F^h)\} \tag{8}$$

where,
$\delta_{PRE\_CAL}^i(cal^j, ecc^k, \sigma_{MUD}^l, \sigma_F^h) = G_{BH}^i(cal^j, ecc^k, \sigma_{MUD}^l, \sigma_F^h) - G_{BH}^{i+1}(cal^j, ecc^k, \sigma_{MUD}^l, \sigma_F^h);$
j=1,2, . . . , $N_{cal}$;
k=1,2, . . . , $N_{ecc}$;
l=1,2, . . . , $N_{MUD}$;
h=1,2, . . . , $N_F$;

and $N_{cal}$, $N_{ecc}$, $N_{MUD}$ and $N_F$ are the total number of discrete points in cal, ecc, $\sigma_{MUD}$, and $\sigma_F$ dimensions, respectively. After the transformation of both the skin-effect measurements (pattern vector $\Psi$) and geometrical factors stored in the predetermined borehole geometrical factor table 418 (pattern vector $\Phi$), the geometry variables may be solved by finding the best matching pattern vector ($\Psi$) to one of the pattern vectors in $\Phi$. The pattern matching can be implemented by means of an objective function, defined as $$T(cal, ecc) = \sum_{i=1}^{m-1} b_i \|\delta^i - \delta_{PRE\_CAL}^i\|^p + \text{regularization} \tag{9}$$

where, $b_i$ is the weighting factor corresponding to $i^{th}$ element of the pattern vector, which normally may be 1. The power p defines the type of normalization used, which normally may be 2. $\delta^i$ is calculated from skin-effect corrected measurements (Equation 6). $\delta_{PRE\_CAL}^i$ is $i^{th}$ element the pattern vector transformed from the predetermined borehole geometrical factor table 418 (FIG. 4). The term "regularization" is normally chosen to be zero. The objective function (T) varies with the borehole diameter (cal) and the eccentricity (ecc) as $\delta_{PRE\_CAL}^i$ is a function of the borehole diameter (cal) and the eccentricity (ecc). The best fitted cal and ecc will yield the minimum target function T. The best fitted cal and ecc represent the solutions of the borehole size and the eccentricity under the presently estimated mud conductivity ($\sigma_{MUD}$) and formation conductivity ($\sigma_F$).

In an alternative embodiment, the geometry parameters may be determined using a nonlinear inversion. The nonlinear inversion procedure may use estimates of the environmental variables with the model of the induction logging tool to generate a model pattern vector. This model pattern vector may be compared to the measured pattern vector ($\Psi$), which is based on the actual measurements from the induction logging device. Based on the difference between the vectors, the eccentricity of the logging device and the borehole diameter variables may be updated until the vectors converge. For more information on modeling techniques for induction logging devices, refer to Gianzero, S.C., "Effect of Sonde Eccentricity on Responses of Conventional Induction-Logging Tools," IEEE Transaction on Geoscience and Electronics, GE-16(4), October 1978, which is hereby incorporated herein by reference.

The construction of the pattern vector is not limited to the Equations (5)-(8). Several different constructions may exist and all adequately express the same pattern. The pattern vector of Equation (6) represents a normalized difference between measurements in the pattern space that results in an increased sensitivity of the eccentricity of the induction logging device and the borehole diameter.

After solving for the eccentricity of the induction logging device and the borehole diameter (block 508), the corresponding borehole geometrical factors may be obtained for each array (block 510) using the predetermined borehole geometrical factor table 418 stored in the memory 412 (FIG. 4).

The predetermined borehole geometrical factor table 418 preferably comprises a four-dimensional array, each dimension representing one of the four environmental variables. Since the measurements from the induction logging device have been skin-effect corrected (block 504), the following relation may be used to calculate the value of the borehole geometrical factors contained in borehole geometrical factor table 418 for each point in the pattern space:

$$\sigma_{SEC} = G_{BH} \times \sigma_{MUD} + [1 - G_{BH}] \times \sigma_F \tag{10}$$

where $G_{BH}$ represents the borehole geometrical factor; $\sigma_{SEC}$ represent a skin-effect corrected measurement; $\sigma_F$ represents formation conductivity; and $\sigma_{MUD}$ represents mud conductivity. Solving for $G_{BH}$ results in:

$$G_{BH} = \frac{\sigma_{SEC} - \sigma_F}{\sigma_{MUD} - \sigma_F} \quad (11)$$

As previously discussed, the borehole geometrical factor table 418 comprises predetermined data used to determine a value for a borehole geometrical factor. These values are unique to the induction logging device, needing to be calculated only once.

Once the borehole geometrical factors are obtained for each receiver coil array (512), mud conductivity ($\sigma_{MUD}$) and formation conductivity ($\sigma_F$) may be solved (block 514) on the following system of linear equations using a linear equation system method, such as the quadratic programming method:

$$\begin{cases} \sigma_{SEC}^1 = \sigma_{MUD} \times G_{BH}^1 + \sigma_F \times (1 - G_{BH}^1) \\ \sigma_{SEC}^2 = \sigma_{MUD} \times G_{BH}^2 + \sigma_F \times (1 - G_{BH}^2) \\ \cdots \quad \vdots \\ \sigma_{SEC}^m = \sigma_{MUD} \times G_{BH}^m + \sigma_F \times (1 - G_{BH}^m) \end{cases} \quad (12)$$

After all four environmental variables, as well as the borehole geometrical factors, have been iteratively calculated (blocks 510-514) until the predetermined condition has been met (block 516), a final borehole correction procedure may apply the resulting four environmental variables and borehole factors to Equation (1) to calculate a borehole corrected conductivity for each receiver coil array (block 518). The procedure of FIG. 5 may be similarly performed by modifying the order of steps and removing and/or adding additional processing steps. The scope of the invention is intended to cover all such variations.

It should be recognized that the foregoing procedure solves for four unknown environmental parameters. The procedure may be readily modified, and indeed simplified, if one or more of the parameters is determined through independent means. For example, the logging device may include a caliper for measuring borehole diameter, a standoff measurement for determining eccentricity, and/or a mud conductivity sensor for measuring the mud conductivity.

Table 1 illustrates a set of options that may be optionally employed by the borehole correction software 112 by utilizing a borehole correction (BHC) flag. The BHC flag may be entered via the keyboard 404 (FIG. 4), selected via the pointing device 408, or, in the some embodiments, preset in the configuration file stored in the memory 412. The various options specify which of the four environmental variables may be solved for by the borehole correction software 112 and which are to be inputted into the system as known values. As can be appreciated by one of ordinary skill in the art, the computation time needed to solve for the four environmental variables is reduced when at least one of the environmental variables is known. The BHC flag permits the known variables to be entered into the borehole correction process, thereby decreasing the time and number of computations needed to solve for the remaining environmental variables.

TABLE 1

| BHC Flag | Brief Description | Detailed Description |
| --- | --- | --- |
| 0 | BHC Disabled | No BHC applied |
| 1 | Conventional BHC | BHC with measured (known) diameter and mud conductivity |
| 2 | Automatic BHC | BHC with diameter and mud conductivity solved. No independently determined parameters. |
| 3 | Diameter Adaptive BHC | BHC with measured (known) mud conductivity. |
| 4 | Mud Conductivity Adaptive BHC | BHC with measured (known) diameter. |

When the BHC flag represents a "0" value, borehole correction is disabled, and skin-effect corrected measurements may be displayed on the display 406. When the BHC flap represents a "1" value, borehole correction may proceed with a known (i.e., measured) borehole diameter and mud conductivity. These measurements may be obtained from a caliper and a mud sensor, respectively, and entered into the correction system 400 via the keyboard 404 or pointing device 408, or stored as a log in a separate file. When the BHC flag represents a "2" value, borehole correction may solve for the borehole diameter and mud conductivity, the procedure presented in FIG. 5. An initial estimate or range of mud conductivity may be supplied via the keyboard 404 or pointing device 408. When the BHC flag represents a "3" value, borehole correction may proceed by solving for the borehole diameter using a measurement of mud conductivity, which may be input into the correction system 400 via the keyboard 404 or pointing device 408, or stored as a log in a separate file. Lastly, a BHC flag value of "4" may solve for the mud conductivity using a measured borehole diameter that is inputted into the correction system 400 as a log file. For all of the preceding options, borehole corrected measurements may be displayed on the display device 406 after completion of the correction procedure (FIG. 5).

The above discussion is meant to be illustrative of the principles and various embodiments of the present invention. Numerous variations and modifications will become apparent to those skilled in the art once the above disclosure is fully appreciated. For example, those of skill in the art will recognize the inverse relation between resistivity measurements and conductivity measurements, and thereby recognize that with trivial adjustments one may be readily substituted for the other in methods for processing induction tool measurements. It is intended that the following claims be interpreted to embrace all such variations and modifications

What is claimed is:

1. A logging method that comprises:
    receiving conductivity measurements from a multi-array induction tool;
    forming an initial estimate of one or more conductivity parameters;
    constructing a measurement pattern vector comprising a set of normalized differences between the conductivity measurements;
    determining one or more geometry parameters using the measurement pattern vector;
    finding borehole geometrical factors using current values of the one or more conductivity parameters and of the one or more geometry parameters;

calculating improved estimates of the one or more conductivity parameters using current values of the borehole geometrical factors; and using the improved estimates to create a log.

2. The method of claim 1, further comprising:
correcting conductivity measurements for environmental effects using calculated conductivity parameters and geometry parameters.

3. The method of claim 1, wherein said determining one or more geometry parameters includes:
comparing the measurement pattern vector to a set of geometry pattern vectors; and
determining the one or more geometry parameters to be those parameters associated with a best-fitting one of the geometry pattern vectors.

4. The method of claim 3, wherein the set of geometry pattern vectors is determined by the borehole geometrical factors associated with current estimates of the one or more conductivity parameters.

5. The method of claim 1, wherein said determining one or more geometry parameters includes:
updating estimates of the one or more geometry parameters to cause a model pattern vector to more closely approximate the measurement pattern vector.

6. The method of claim 1, further comprising:
repeating said determining, finding, and calculating until at least one predetermined condition is satisfied.

7. The method of claim 6, wherein the at least one predetermined condition includes reaching a predetermined number of iterations.

8. The method of claim 6, wherein the at least one predetermined condition includes obtaining a pattern vector difference less than a predetermined threshold.

9. The method of claim 6, wherein the at least one predetermined condition includes a percentage change in one or more parameters falling below a predetermined threshold.

10. The method of claim 6, wherein said conductivity measurements are associated with a borehole position, and wherein said receiving, forming, constructing, determining, finding, calculating, and repeating are performed to determine a formation conductivity at each of multiple borehole positions.

11. The method of claim 1, wherein the one or more conductivity parameters includes formation conductivity.

12. The method of claim 1, wherein the one or more conductivity parameters includes mud conductivity.

13. The method of claim 1, wherein the one or more conductivity parameters includes formation resistivity and/or mud resistivity.

14. The method of claim 1, wherein the one or more geometry parameters includes tool eccentricity.

15. The method of claim 1, wherein the one or more geometry parameters includes borehole diameter.

16. The method of claim 1, further comprising:
applying resolution-matching filters to the conductivity measurements before constructing a measurement pattern vector.

17. The method of claim 1, wherein said conductivity measurements are corrected for skin-effect.

18. The method of claim 1, wherein the measurement pattern vector includes a sequence of normalized differences between conductivity measurements made via arrays on the induction tool.

19. The method of claim 18, wherein the sequence of differences are normalized by a difference between mud conductivity and formation conductivity, and wherein said constructing the measurement pattern vector is iteratively repeated with the current values of the one or more conductivity parameters.

20. A system that comprises:
a processor; and
a memory that stores borehole correction software, wherein the software configures the processor to:
retrieve conductivity measurements made by a logging tool;
construct at least one measurement pattern vector from the conductivity measurements;
determine at least one geometry parameter associated with an approximation of the at least one measurement pattern vector, wherein the at least one geometry parameter includes tool eccentricity;
find geometrical factors using current values of at least one conductivity parameter and said at least one geometry parameter; and
update the current value of the at least one conductivity parameter using current values of the geometrical factors.

21. The system of claim 20, wherein the software further configures the processor to:
correct said conductivity measurements for environmental effects using current values of the at least one conductivity parameter and the at least one geometry parameter.

22. The system of claim 20, wherein as part of said determining, the software configures the processor to:
compare the measurement pattern vector to a set of geometry pattern vectors; and
determine the at least one geometry parameter to be that associated with a best-fitting one of the geometry pattern vectors.

23. The system of claim 22, wherein the set of geometry pattern vectors is determined from geometrical factors associated with the current value of the at least one conductivity parameter.

24. The system of claim 20, wherein as part of said determining, the software configures the processor to:
update the current value of the at least one geometry parameter to cause a model pattern vector to more closely approximate the measurement pattern vector.

25. The system of claim 20, wherein the software further configures the processor to:
repeat said determining, finding, and updating until at least one predetermined condition is satisfied.

26. The system of claim 25, wherein the at least one predetermined condition includes reaching a predetermined number of iterations.

27. The system of claim 25, wherein the at least one predetermined condition includes obtaining a pattern vector difference less than a predetermined threshold.

28. The system of claim 25, wherein the at least one predetermined condition includes a percentage change in one or more parameters falling below a predetermined threshold.

29. The system of claim 25, wherein said conductivity measurements are associated with a borehole position, and wherein the software further configures the processor to perform said retrieving, constructing, determining, finding, updating, and repeating to determine a formation conductivity at each of multiple borehole positions.

30. The system of claim 20, wherein the at least one conductivity parameter includes formation conductivity.

31. The system of claim 20, wherein the at least one conductivity parameter includes mud conductivity.

32. The system of claim 20, wherein the at least one conductivity parameter includes formation resistivity and/or mud resistivity.

33. The system of claim 20, wherein the at least one geometry parameter includes borehole diameter.

34. The system of claim 20, wherein the software further configures the processor to:
apply resolution-matching filters to the conductivity measurements before constructing a measurement pattern vector.

35. The system of claim 20, wherein said conductivity measurements are corrected for skin-effect.

36. A system that comprises:
a processor; and
a memory that stores borehole correction software, wherein the software configures the processor to:
retrieve conductivity measurements made by a logging tool;
construct at least one measurement pattern vector from the conductivity measurements, wherein the at least one measurement pattern vector includes a sequence of normalized differences, each normalized difference being between conductivity measurements made at different effective depths of investigation by the logging tool;
determine at least one geometry parameter associated with an approximation of the at least one measurement pattern vector;
find geometrical factors using current values of at least one conductivity parameter and said at least one geometry parameter; and
update the current value of the at least one conductivity parameter using current values of the geometrical factors.

37. The system of claim 36, wherein each of the sequences of differences is normalized by a difference between estimates of mud conductivity and formation conductivity, and wherein the software configures the processor to iteratively repeat said construction of the at least one measurement pattern vector with current estimates of the mud conductivity and the formation conductivity.

* * * * *

UNITED STATES PATENT AND TRADEMARK OFFICE
CERTIFICATE OF CORRECTION

PATENT NO. : 7,269,514 B2
APPLICATION NO. : 10/843072
DATED : September 11, 2007
INVENTOR(S) : Jiaqi Xiao It is certified that error appears in the above-identified patent and that said Letters Patent is hereby corrected as shown below:

In column 1, line 41, please amend "MMWD" to read --MWD--.

In column 4, equation (1), the fraction should read $$-- \sigma_{BHC} = \frac{\sigma_{SEC} - \sigma_{MUD} \times G_{BH}(eccentricity, diameter, \sigma_{MUD}, \sigma_F)}{1 - G_{BH}(eccentricity, diameter, \sigma_{MUD}, \sigma_F)} --.$$

In column 7, line 26, please amend "σhd F" to read -- $\sigma_F$ --.

Signed and Sealed this

Twenty-fifth Day of December, 2007

JON W. DUDAS
*Director of the United States Patent and Trademark Office*